US008599476B1

(12) United States Patent
Kozlov et al.

(10) Patent No.: US 8,599,476 B1
(45) Date of Patent: Dec. 3, 2013

(54) ALIGNMENT AND OPTIMIZATION OF A SYNCHRONOUSLY PUMPED OPTICAL PARAMETRIC OSCILLATOR FOR NONLINEAR OPTICAL GENERATION

(71) Applicant: Microtech Instruments, Eugene, OR (US)

(72) Inventors: Vladimir G. Kozlov, Eugene, OR (US); Walter C. Hurlbut, Eugene, OR (US)

(73) Assignee: Microtech Instruments, Inc., Eugene, OR (US)

( * ) Notice: Subject to any disclaimer, the term of this patent is extended or adjusted under 35 U.S.C. 154(b) by 0 days.

(21) Appl. No.: 13/787,819

(22) Filed: Mar. 7, 2013

Related U.S. Application Data

(62) Division of application No. 12/830,287, filed on Jul. 3, 2010.

(51) Int. Cl.
*G02F 1/35* (2006.01)

(52) U.S. Cl.
USPC .............................................. 359/330; 372/6

(58) Field of Classification Search
USPC ........................................................ 359/330
See application file for complete search history.

(56) References Cited

U.S. PATENT DOCUMENTS

| 5,017,806 | A | 5/1991 | Edelstein et al. |
| 5,212,698 | A | 5/1993 | Kafka et al. |
| 5,365,366 | A | 11/1994 | Kafka et al. |
| 5,371,752 | A | 12/1994 | Powers et al. |
| 5,377,043 | A | 12/1994 | Pelouch et al. |
| 5,406,408 | A | 4/1995 | Ellingson et al. |
| 5,847,861 | A | 12/1998 | Kafka et al. |
| 6,282,014 | B1 | 8/2001 | Long et al. |
| 6,304,585 | B1 | 10/2001 | Sanders et al. |
| 6,785,041 | B1 | 8/2004 | Vodopyanov |
| 7,272,158 | B1 | 9/2007 | Hayes et al. |
| 7,339,718 | B1 | 3/2008 | Vodopyanov et al. |
| 7,349,609 | B1 | 3/2008 | Vodopyanov et al. |
| 7,508,853 | B2 * | 3/2009 | Harter et al. ................... 372/30 |
| 7,616,304 | B2 | 11/2009 | Gankkhanov et al. |
| 2008/0037595 | A1 | 2/2008 | Gankkhanov et al. |
| 2011/0268140 | A1 | 11/2011 | Keaton et al. |
| 2011/0273763 | A1* | 11/2011 | Kaertner et al. ............... 359/330 |
| 2012/0262779 | A1 | 10/2012 | Raybaut et al. |

FOREIGN PATENT DOCUMENTS

| WO | WO 2007/132229 | 11/2007 |
| WO | WO 2008/135257 | 11/2008 |

OTHER PUBLICATIONS

U.S. Appl. No. 12/830,287, filed Jul. 3, 2010, Kozlov et al.
U.S. Appl. No. 13/787,814, filed Mar. 7, 2013, Kozlov et al.
Kieu et al; High-power picoseconds fiber source for coherent Raman spectroscopy; Optics Letters vol. 34 p. 2051 (2009).

(Continued)

*Primary Examiner* — Hemang Sanghavi
(74) *Attorney, Agent, or Firm* — David S. Alavi

(57) ABSTRACT

A synchronously pumped optical parametric oscillator (OPO) comprises a nonlinear optical medium positioned in an optical resonator (e.g., a ring resonator) and is pumped by a pump laser source. A first arrangement includes a positioning mechanism for translating the nonlinear optical medium so OPO resonant modes propagate through one of multiple longitudinal regions arranged for differing odd orders of quasi-phase-matching. A second arrangement includes a pump fiber laser oscillator stretched to adjust its repetition rate to match that of the OPO. A third arrangement includes a time-domain-multiplexer (TDM) fiber loop between a pump fiber laser oscillator and fiber laser amplification stage(s). The TDM loop increases the pump repetition rate to enable increased average pump power without increased peak power.

8 Claims, 14 Drawing Sheets

(56) References Cited

OTHER PUBLICATIONS

Saar et al; Intracavity wavelength modulation of an optical parametric oscillator for coherent Raman microscopy; Optics Express vol. 17 p. 12532 (2009).

Schaar et al; Intracavity terahertz-wave generation in a synchronously pumped optical parametric oscillator using quasi-phase-matched GaAs; Optics Letters vol. 32 p. 1284 (2007).

Lee et al; Generation of multicycle terahertz pulses via optical rectification in periodically inverted GaAs structures; Applied Physics Letters vol. 89 p. 181104 (2006).

Vodopyanov et al; Resonantly-enhanced THz-wave generation via multispectral mixing inside a ring-cavity optical parametric oscillator; Conference on Lasers and Electro-Optics/International Quantum Electronics Conference, OSA Technical Digest (Optical Society of America, 2009), CLEO paper CTuG1.

Kokabee et al; "Efficient, high-power, 16-GHz, picosecond optical parametric oscillator pumped by an 81-MHz fiber laser"; Conference on Lasers and Electro-Optics/International Quantum Electronics Conference, OSA Technical Digest (Optical Society of America, 2010), CLEO paper CThP2.

Hurlbut et al; "THz-wave generation inside a high-finesse ring-cavity OPO pumped by a fiber laser"; Conference on Lasers and Electro-Optics/International Quantum Electronics Conference, OSA Technical Digest (Optical Society of America, 2010), CLEO paper CWF3.

Restriction requirement dated Sep. 14, 2012 in co-owned parent U.S. Appl. No. 12/830,287.

Office action dated Feb. 6, 2013 in co-owned parent U.S. Appl. No. 12/830,287.

\* cited by examiner

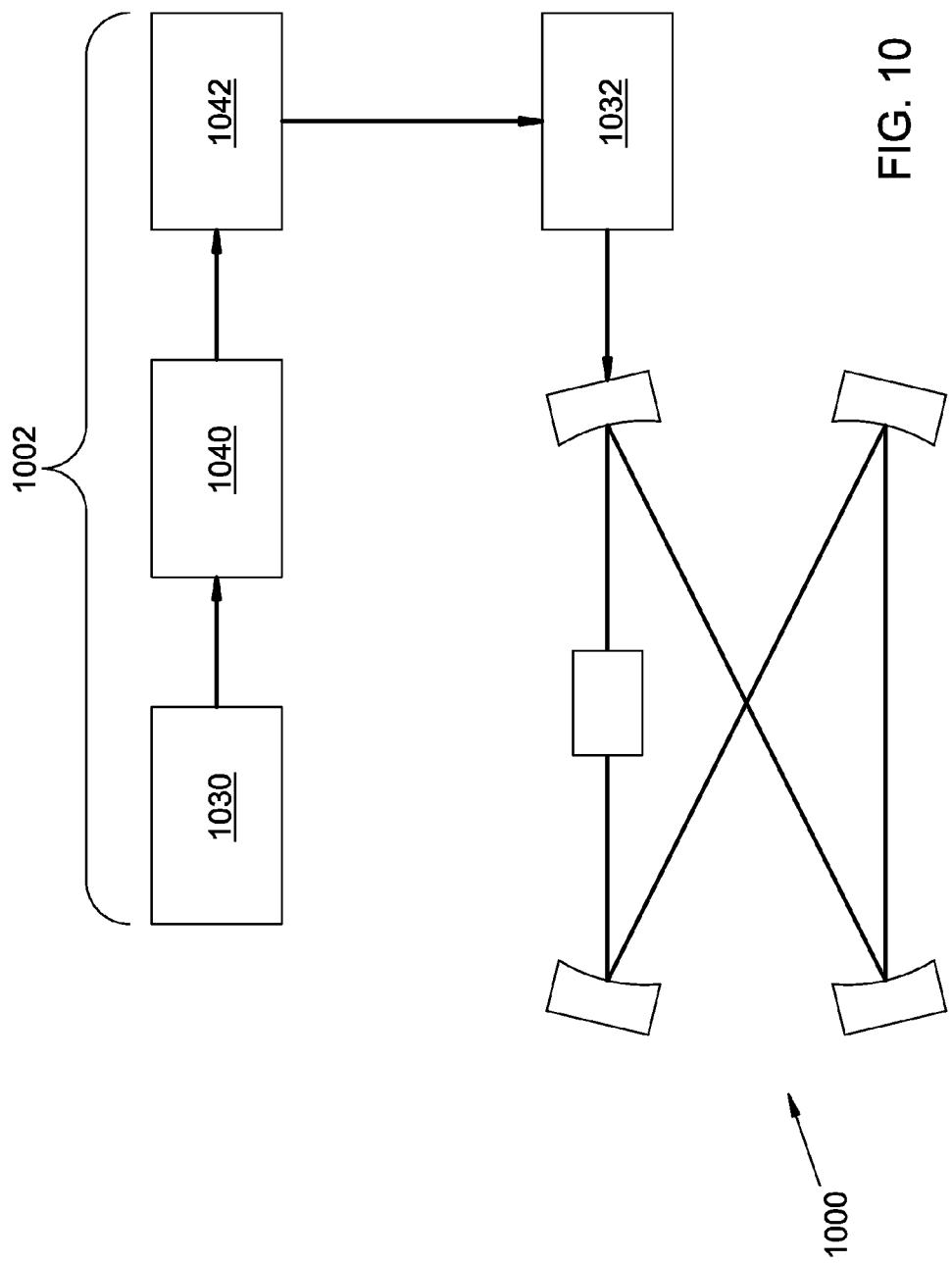

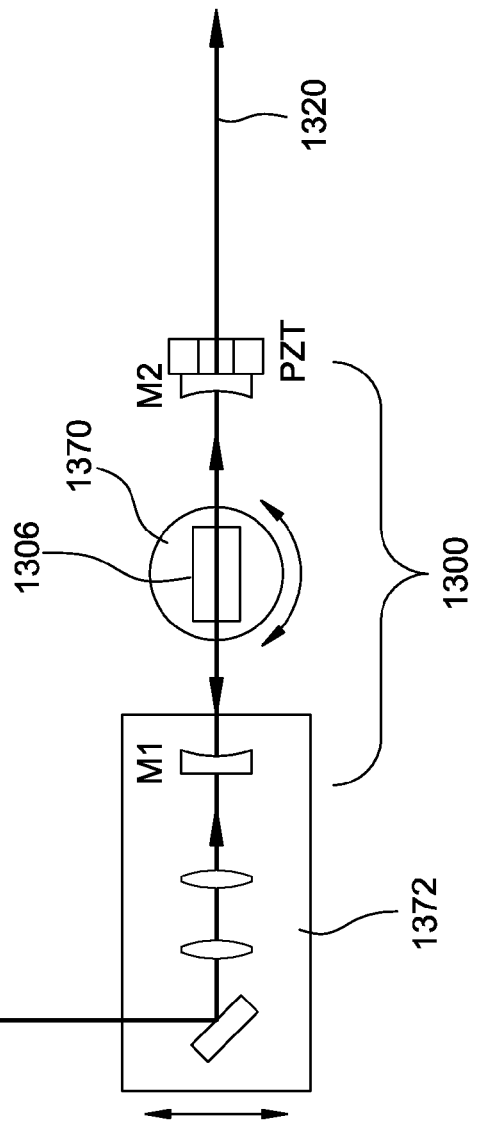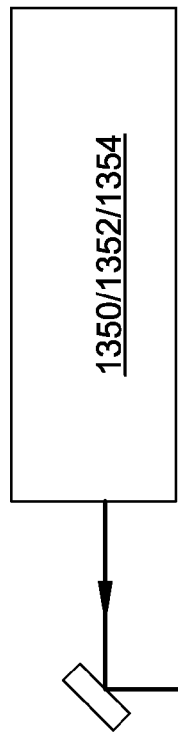
FIG. 13

ALIGNMENT AND OPTIMIZATION OF A SYNCHRONOUSLY PUMPED OPTICAL PARAMETRIC OSCILLATOR FOR NONLINEAR OPTICAL GENERATION

BENEFIT CLAIMS TO RELATED APPLICATIONS

This application is a divisional of U.S. non-provisional application Ser. No. 12/830,287 entitled "Alignment and optimization of a synchronously pumped optical parametric oscillator for nonlinear optical generation" filed Jul. 3, 2010 in the names of Vladimir G. Kozlov and Walter C. Hurlbut, said application being hereby incorporated by reference as if fully set forth herein.

BACKGROUND

The field of the present invention relates to synchronously pumped optical parametric oscillators. In particular, apparatus and methods are disclosed herein for alignment and optimization of a synchronously pumped optical parametric oscillator for nonlinear optical generation.

A wide variety of optical parametric oscillators (OPO's) have been described previously, as well as schemes for nonlinear optical generation that employ OPO's. Some of these are described in:

U.S. Pat. No. 5,017,806 entitled "Broadly tunable high repetition rate femtosecond optical parametric oscillator" issued May 21, 1991 to Edelstein et al;

U.S. Pat. No. 5,212,698 entitled "Dispersion compensation for ultrashort pulse generation in tuneable lasers" issued May 18, 1993 to Kafka et al;

U.S. Pat. No. 5,365,366 entitled "Synchronously pumped sub-picosecond optical parametric oscillator" issued Nov. 15, 1994 to Kafka et al;

U.S. Pat. No. 5,371,752 entitled "Optical parametric oscillation using KTA nonlinear crystals" issued Dec. 6, 1994 to Powers et al;

U.S. Pat. No. 5,377,043 entitled "Ti:sapphire-pumped high repetition rate femtosecond optical parametric oscillator" issued Dec. 27, 1994 to Pelouch et al;

U.S. Pat. No. 5,406,408 entitled "Intracavity-doubled tunable optical parametric oscillator" issued Apr. 11, 1995 to Ellingson et al;

U.S. Pat. No. 5,847,861 entitled "Synchronously pumped sub-picosecond optical parametric oscillator" issued Dec. 8, 1998 to Kafka et al;

U.S. Pat. No. 6,282,014 entitled "Cascade optical parametric oscillator for down-conversion" issued Aug. 28, 2001 to Long et al;

U.S. Pat. No. 7,272,158 entitled "Highly efficient waveguide pulsed THz electromagnetic radiation source and group-matched waveguide THz electromagnetic radiation source" issued Sep. 18, 2007 to Hayes et al;

U.S. Pat. No. 7,339,718 entitled "Generation of terahertz radiation in orientation-patterned semiconductors" issued Mar. 4, 2008 to Vodopyanov et al;

U.S. Pat. No. 7,349,609 entitled "Terahertz radiation generation and methods therefor" issued Mar. 25, 2008 to Vodopyanov et al;

U.S. Pat. No. 7,616,304 entitled "System and method for providing a tunable optical parametric oscillator laser system that provides dual frequency output for non-linear vibrational spectroscopy and microscopy" issued Nov. 10, 2009 to Gankkhanov et al;

U.S. Pub. No. US 2008/0037595 entitled "System and method for providing a tunable optical parametric oscillator laser system that provides dual frequency output for non-linear vibrational spectroscopy and microscopy" published Feb. 14, 2008 in the names of Gankkhanov et al;

Pub. No. WO 2007/132229 entitled "Optical parametric oscillator" published Nov. 22, 2007 in the names of Ebrahim-Zadeh et al;

Pub. No. WO 2008/135257 entitled "Method and optical arrangement for generating a nonlinear optical signal on a material which is excited by an excitation field, and use of the method and of the optical arrangement" published Nov. 13, 2008 in the names of Rimke et al;

Kieu et al; "High-power picoseconds fiber source for coherent Raman spectroscopy"; Optics Letters vol 34 p 2051 (2009);

Saar et al; "Intracavity wavelength modulation of an optical parametric oscillator for coherent Raman microscopy"; Optics Express vol 17 p 12532 (2009);

Schaar et al; "Intracavity terahertz-wave generation in a synchronously pumped optical parametric oscillator using quasi-phase-matched GaAs"; Optics Letters vol 32 p 1284 (2007);

Lee et al; "Generation of multicycle terahertz pulses via optical rectification in periodically inverted GaAs structures"; Applied Physics Letters vol 89 p 181104 (2006);

Vodopyanov et al; "Resonantly-enhanced THz-wave generation via multispectral mixing inside a ring-cavity optical parametric oscillator"; *Conference on Lasers and Electro-Optics/International Quantum Electronics Conference*, OSA Technical Digest (Optical Society of America, 2009), CLEO paper CTuG1;

Kokabee et al; "Efficient, high-power, 16-GHz, picosecond optical parametric oscillator pumped by an 81-MHz fiber laser"; *Conference on Lasers and Electro-Optics/International Quantum Electronics Conference*, OSA Technical Digest (Optical Society of America, 2010), CLEO paper CThP2; and Hurlbut et al; "THz-wave generation inside a high-finesse ring-cavity OPO pumped by a fiber laser"; *Conference on Lasers and Electro-Optics/International Quantum Electronics Conference*, OSA Technical Digest (Optical Society of America, 2010), CLEO paper CWF3.

SUMMARY

A synchronously pumped optical parametric oscillator (OPO) comprises a nonlinear optical medium positioned in an optical resonator and is pumped by a pump laser source. A first arrangement includes a positioning mechanism for translating the nonlinear optical medium so the OPO resonant optical modes propagate through one of multiple longitudinal regions arranged for differing odd orders of quasi-phase-matching. A second arrangement includes a pump source fiber laser oscillator arranged to be stretched to adjust its repetition rate to match that of the OPO. A third arrangement includes a time-domain-multiplexer (TDM) fiber loop between a pump source fiber laser oscillator and one or more fiber laser amplification stages. The TDM loop increases the pump laser source repetition rate to enable increased average pump power without commensurately increased peak power.

Objects and advantages pertaining to optical parametric oscillators or nonlinear optical generation may become apparent upon referring to the exemplary embodiments illus-

BRIEF DESCRIPTION OF THE DRAWINGS

FIG. 10 illustrates schematically another exemplary embodiment of a synchronously pumped optical parametric oscillator.

FIG. 13 illustrates schematically another exemplary embodiment of a synchronously pumped optical parametric oscillator.

The embodiments shown in the Figures are exemplary, and should not be construed as limiting the scope of the present disclosure or appended claims.

DETAILED DESCRIPTION OF EMBODIMENTS

Figure 1:
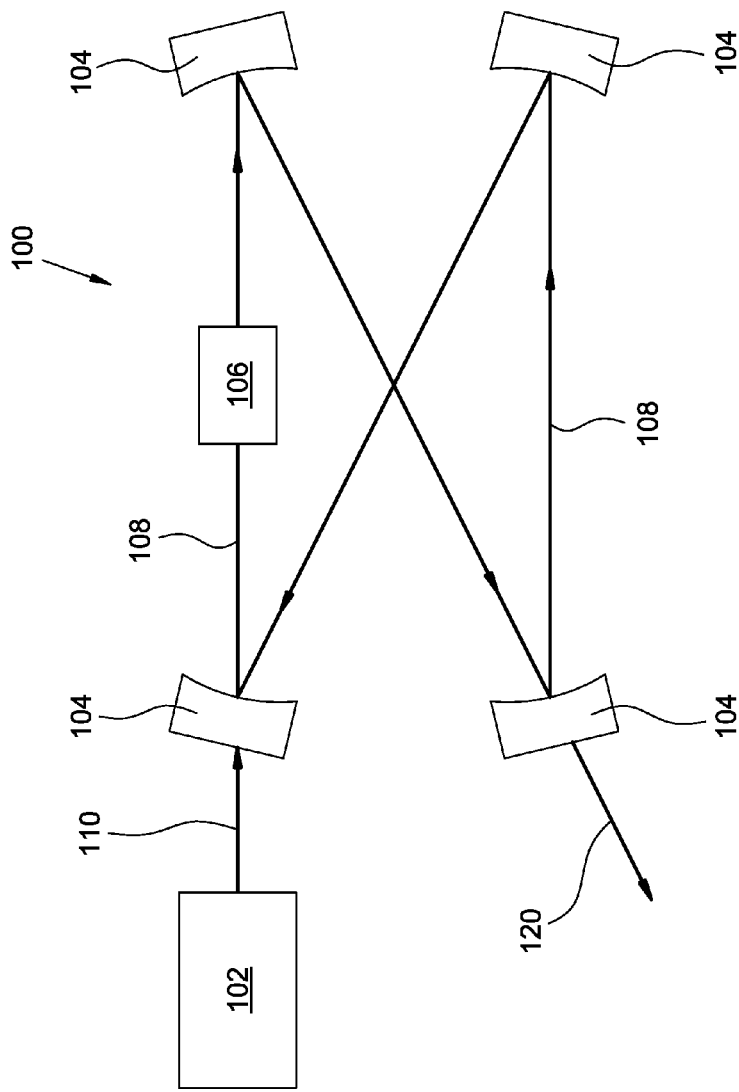
FIG. 1 illustrates schematically an example of a general arrangement of synchronously pumped optical parametric oscillators.

A basic ring optical resonator arrangement of a synchronously pumped optical parametric oscillator (OPO) is illustrated schematically in FIG. 1. The OPO 100 is pumped by a pump laser source 102 that produces a train of pump pulses at a pump wavelength $\lambda_{pump}$. The pump pulse train can be at least partly characterized by average power $P_{pump}$, pulse duration $\tau_{pump}$, spectral bandwidth $\Delta\nu_{pump}$, and a pulse repetition rate $R_{pump}$ ($\equiv 1/T_{pump}$, where $T_{pump}$ is the time interval between successive pump pulses and is typically equal to a cavity round trip time for a pump laser source oscillator). The pump pulse train can be further characterized by a more detailed relationship between wavelength (within the pump spectral profile) and time delay (within the pump pulse temporal profile). An example of such a spectral-temporal profile is illustrated schematically in FIG. 2.

The synchronously pumped OPO 100 is shown in the example of FIG. 1 arranged as a ring optical resonator defined by two or more mirrors 104 (four mirrors are shown in the schematic example of FIG. 1; any suitable number of mirrors can be employed, with one or more reflections from each mirror, as needed or desired). The ring optical resonator is arranged to support one or more resonant optical modes 108 at a signal wavelength $\lambda_{sig}$ or an idler wavelength $\lambda_{idler}$. If the resonator supports one or more optical modes 108 at only one or the other of the signal or idler wavelengths, it is considered singly resonant; if the resonator supports one or more optical modes 108 at both signal and idler wavelengths, it is considered doubly resonant. A nonlinear optical medium 106 is positioned within the resonator and arranged to provide optical parametric gain at the signal and idler wavelengths when optically pumped at the pump wavelength, with $1/\lambda_{pump}=1/\lambda_{sig}+1/\lambda\text{-idler}$. A wide variety of arrangements of the nonlinear optical medium can be employed, and usually include some sort of arrangement or adaptation for phase matching or quasi-phase-matching of the pump, signal, and idler radiation. The resonator and nonlinear optical medium 106 are often arranged so that the resonant optical modes 108 go through a beam waist in the medium 106. At least one of the mirrors 104 transmits a substantial fraction of pump radiation at $\lambda_{pump}$, which is typically delivered as an optical beam 110 propagating through a beam waist within the medium 106. The phase matching or quasi-phase-matching conditions, along with the pump beam propagation direction, usually determine $\lambda_{sig}$ and $\lambda_{idler}$, as well as a direction of unidirectional propagation of the signal and idler radiation. If phase matching or quasi-phase-matching conditions do not sufficiently restrict the signal and idler wavelengths, an additional wavelength-selective element can be incorporated into the OPO 100 (e.g., a Lyot filter or an etalon; not shown).

Pump radiation propagating through the nonlinear optical medium 106 provides optical parametric gain at the signal and idler wavelengths, and if that gain is above an oscillation threshold for the resonator, steady-state oscillation will occur in the supported signal or idler resonant modes. When the pump radiation is delivered in the form of a train of optical pulses, sufficient gain typically is produced when a cavity round trip time of the resonator $T_{res}$ is substantially equal to $T_{pump}$ ($\equiv 1/R_{pump}$). This condition is referred to as synchronous pumping. Such synchronous pumping is advantageous because the train of pump pulses generates higher peak pump power (and therefore proportionately higher parametric gain) in the nonlinear optical medium than the same average power delivered at a constant power level. For example, the enhancement of peak pump power is on the order of $10^3$ for 10 ps pulses delivered at a 100 MHz repetition rate (i.e., $\tau_{pump}=10$ ps and $T_{pump}=10$ ns). Proper operation of the OPO 100 therefore requires substantial matching of the ring resonator repetition rate (equivalently, cavity length) to the pump pulse repetition rate. Such matching can be achieved by passive alignment and adjustment of the pump laser source or OPO (e.g., construction of the OPO using stable mounting hardware on a length-stable platform and manual adjustment of the OPO cavity length to match the pump pulse repetition rate), or can be maintained by active-feedback control and adjustment of the pump laser source or OPO (e.g., piezoelectric control of the cavity length of the OPO or pump laser oscillator in response to an electrical error signal generated by pump/OPO cavity length mismatch).

Synchronous pumping can also be achieved when the pump laser source round trip time $T_{pump}$ is a multiple or submultiple of the OPO resonator cavity round trip time. Sufficient parametric gain is provided when the resonating intracavity signal and idler pulses arrive at the nonlinear optical medium when a pump pulse is present in the medium.

This can occur when the cavity round trip times are substantially matched (as described above), or when one is an integer multiple (×2, ×3, etc), an integer submultiple (÷2, ÷3, etc), or a rational multiple (×n/m where n and m are integers) of the other.

Figure 3:
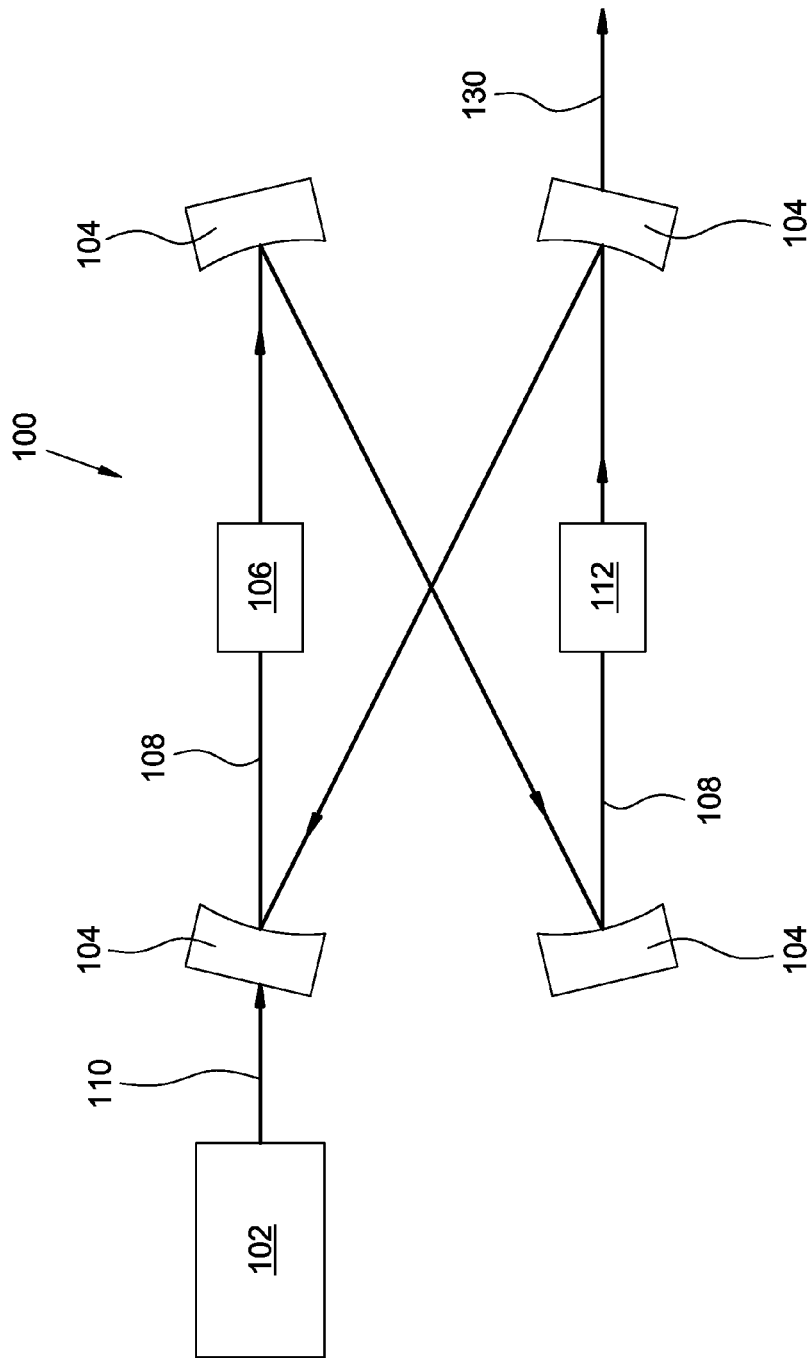
FIG. 3 illustrates schematically an example of another general arrangement of synchronously pumped optical parametric oscillators.

The wavelength $\lambda_{out}$ of the output radiation of the OPO 100 can be one or both of the signal wavelength $\lambda_{sig}$ or the idler wavelength $\lambda_{idler}$ (illustrated schematically in FIG. 1). A least one mirror 104 can partially transmit the desired output wavelength(s), though which an output beam 120 propagates. Instead, or in addition, a second nonlinear medium 112 can be positioned within the optical resonator (illustrated schematically in FIG. 3), typically positioned at a second beam waist of the resonant optical modes 108. That second nonlinear optical medium 112 can be arranged to generate output radiation by any of a variety of nonlinear optical processes, including but not limited to: second harmonic generation of the signal or idler; sum frequency generation of the signal or idler with the pump; or difference frequency generation between the signal and idler. That latter process, namely, difference frequency generation, can be employed to generate output radiation, e.g., in the terahertz (THz) frequency range. Whatever nonlinear optical process is employed, the arrangement of the second nonlinear optical medium typically includes appropriate phase matching or quasi-phase-matching. The output radiation can be transmitted through one of the mirrors 104 (e.g., output beam 130 in the example of FIG. 3), or can be directed out of the OPO by an intracavity output mirror (e.g., output beam 630 in the example of FIG. 6).

A variety of novel arrangements, and novel alignment or optimization techniques, are disclosed herein for a synchronously pumped optical parametric oscillator. The examples disclosed employ a pump laser source that includes a continuous-wave (cw) modelocked fiber laser oscillator, and typically also includes at least one fiber laser amplification stage. Some of the disclosed pump laser sources operate with $\lambda_{pump}$ between about 1.0 μm and about 1.1 μm. Some of the disclosed examples of OPO's are arranged as synchronously pumped ring cavities, employ quasi-phase-matched (QPM) nonlinear optical media and Type 0 phase matching, and operate with $\lambda_{sig}$ and $\lambda_{idler}$ between about 1.9 μm and about 2.4 μm. However, the arrangements and techniques disclosed herein can be employed using other types of pump laser sources (e.g., solid state laser sources, frequency-doubled laser sources, or non-modelocked laser sources), using pump laser sources operating at other pump wavelengths, using other types of OPO's (e.g., arranged with a linear cavity, or not synchronously pumped), using other types of nonlinear optical media or phase matching (e.g., single crystal, angle-tuned critical phase-matched or temperature tuned non-critically phase-matched, Type I or II, etc.), or operating over differing signal and idler wavelength ranges. The arrangements and techniques disclosed herein shall not be limited to the examples shown, but can be employed (to the extent they are applicable) to other types of OPO's as well.

It has been observed that in many instances OPO's exhibit improved performance characteristics (e.g., improved power or spectral stability; reduced output spectral bandwidth or time-bandwidth product; narrowed gain spectral profile; improved spatial profile) when operated with the optical parametric gain closer to a threshold level (e.g., with parametric gain less than about 5× the threshold gain). However, such operation makes initial alignment and optimization of the OPO quite difficult. It has been recognized as desirable to enable initial alignment and optimization while operating the OPO with the parametric gain well above threshold, and then to reduce the parametric gain for further optimization and operation of the OPO. An exemplary arrangement for achieving that result is illustrated schematically in FIG. 4.

Figure 4:
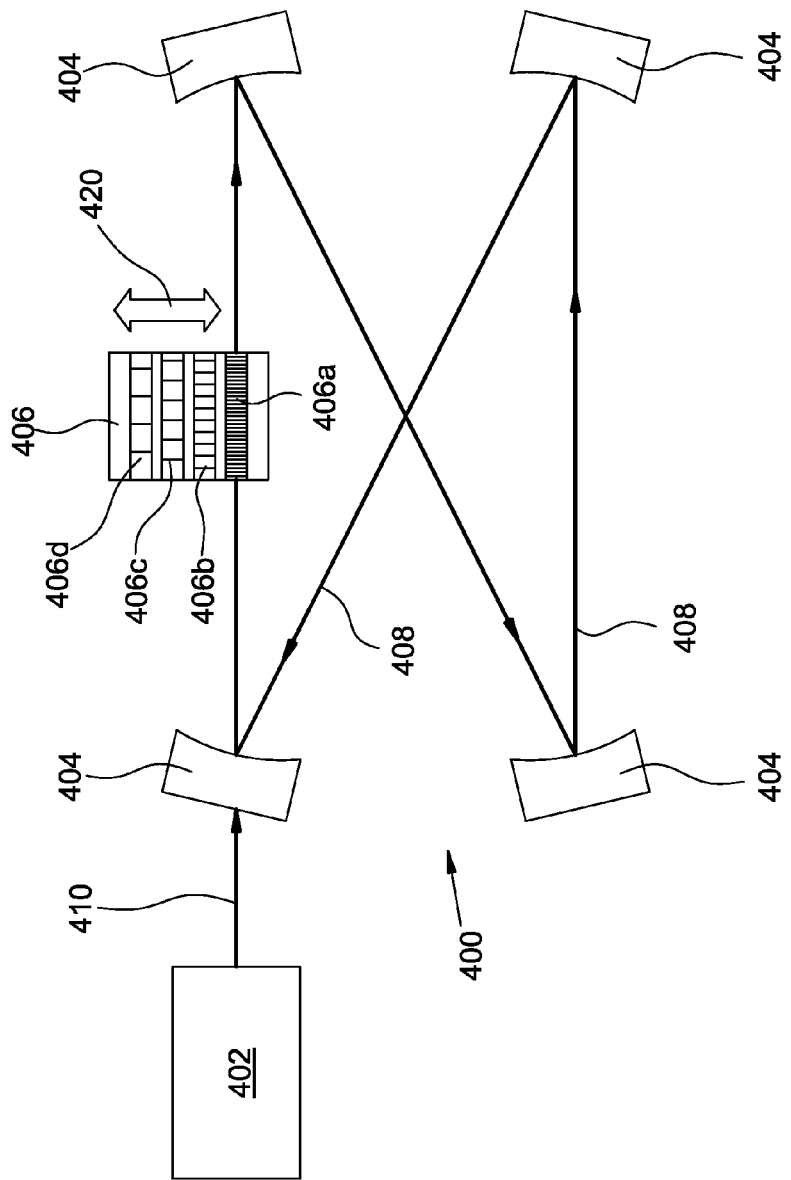
FIG. 4 illustrates schematically an exemplary embodiment of a synchronously pumped optical parametric oscillator.

In the example of FIG. 4, an OPO 400 comprises mirrors 404 and a nonlinear optical medium 406 and supports one or more resonant optical modes 408. The OPO 400 is pumped by a pump laser source 402 that delivers a pump beam 410 through one of the OPO mirrors 404 to the nonlinear medium 406. The example of FIG. 4 does not include a second nonlinear optical medium for producing output radiation at $\lambda_{out}$ that differs from $\lambda_{sig}$ and $\lambda_{idler}$, but the arrangement of nonlinear optical medium 406 (described further below) for altering the parametric gain is also applicable in an OPO that includes such a second nonlinear optical medium.

Figure 5B:
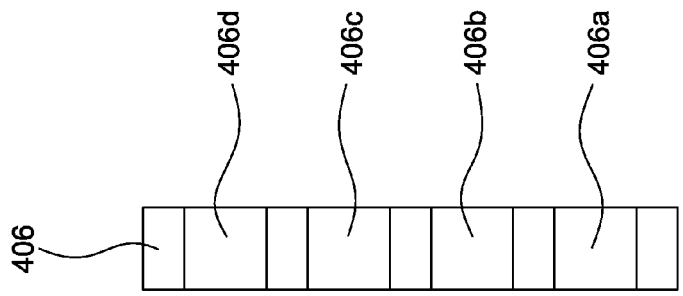
FIGS. 5A and 5B illustrate schematically an exemplary nonlinear optical medium suitable for use in the embodiment of FIG. 4.
Figure 5A:
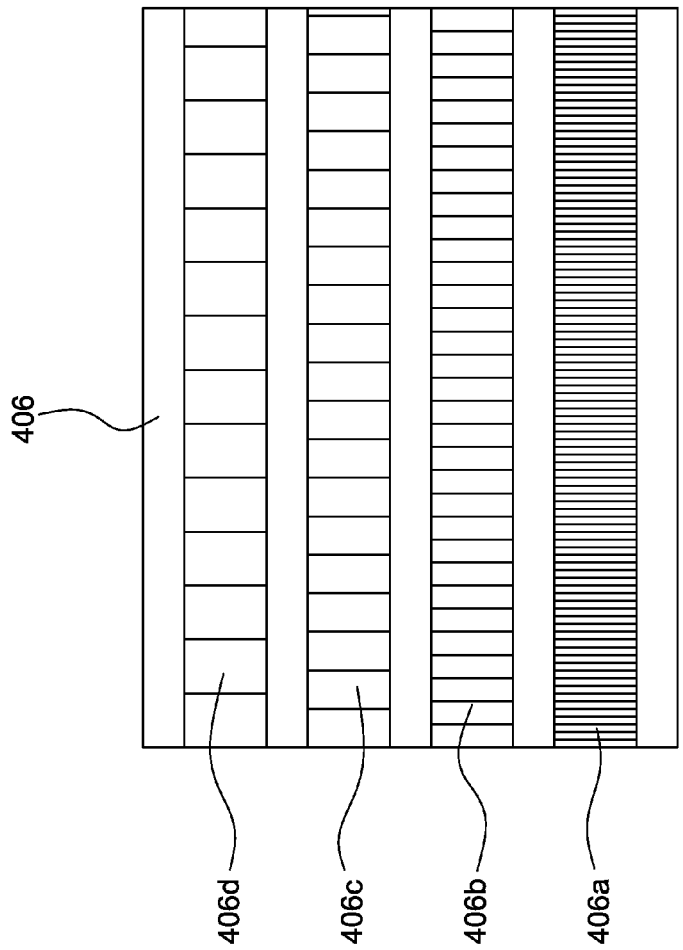

The nonlinear optical medium 406 comprises a nonlinear optical material arranged for odd-order, quasi-phase-matched optical parametric conversion of radiation at the pump wavelength into radiation at the signal and idler wavelengths (using Type 0 phase matching, with parallel pump, signal, and idler polarizations). An exemplary material comprises periodically poled lithium niobate (PPLN); other suitable QPM material can be employed. The nonlinear optical medium 406 comprises two or more transversely distinct, longitudinally extending regions 406a, 406b, etc (referred to generically or collectively as 406x) within the medium. These are more clearly shown in FIGS. 5A and 5B. At least one of the regions, e.g., 406a, differs from that of another of the regions, e.g., 406b, with respect to their respective odd orders of quasi-phase-matching of the optical parametric conversion. For example, region 406a might be arranged for $1^{st}$ order QPM of the desired pump, signal, and idler wavelengths, while region 406b might be arranged for $3^{rd}$ order QPM of those wavelengths. A positioning mechanism 420 is arranged to translate the nonlinear optical medium 406 in a transverse direction relative to a longitudinal direction of propagation of the resonant optical modes 408 through the nonlinear optical medium 406. The positioning mechanism 420 is arranged to translate the nonlinear optical medium 406 so that the resonant optical modes 408 propagate through any chosen one (e.g., region 406a, 406b, 406c, . . . ) among two or more of the regions 406x. The positioning mechanism can comprise any suitable translator, translation stage, moveable platform, or actuator (any of which can be manual, mechanized, or automated), or other hardware or software suitable for moving the nonlinear medium 406 as described. If the regions 406x are transversely arranged in a single line relative to one another (as in the examples of FIGS. 4, 5A, and 5B), then a single axis of transverse motion (substantially parallel to the row of regions 406x) is sufficient. If the regions 406x are arranged in two transverse dimensions (not shown), then two-dimensional transverse motion of the medium 406 can be employed to enable any one of those regions 406x to be positioned so that the optical modes 408 would propagate through it.

Transverse movement of the nonlinear optical medium 406, and the differing QPM orders of the regions 406x, enable the optical parametric gain of the OPO to be altered without altering the alignment of the OPO or the power delivered via pump beam 410. In an exemplary method, initial alignment and optimization of the OPO 400 is performed with the nonlinear medium 406 positioned so that the optical modes 408 propagate through the region having the lowest QPM order (e.g., region 406a arranged for $1^{st}$ order QPM). The optical parametric gain of a given QPM optical medium scales approximately as $1/N^2$ (where N is an odd QPM order; even QPM orders produce negligible parametric gain) so that the region with the lowest QPM order exhibits the highest parametric gain. This enables the OPO to be more readily aligned to establish oscillation of the signal or idler (or both, if OPO 400 is doubly resonant). Once oscillation is established, the OPO can be further optimized (e.g., by angular adjustment of the mirrors 404, by adjustment of the cavity length to substantially match $T_{pump}$, by adjusting focusing properties of modes 408 or pump beam 410, and so on; such adjustments are typically made iteratively) to achieve a first desired level of optical parametric conversion from the pump wavelength to the signal and idler wavelengths. The desired level of parametric conversion can be based on an absolute level of optical power generated at the signal or idler wavelength, or on the conversion efficiency from pump to signal and idler, and can be a specific level (e.g., 100 mW of idler, or 30% conversion of pump power) or can be a maximum attained under the given conditions.

With the optical modes 408 propagating through region 406a with the lowest odd QPM order, the OPO operates at the maximum available parametric gain, i.e., as far above threshold as possible for that particular combination of OPO arrangement and nonlinear optical medium. As noted above, however, operating OPO 400 far above threshold (e.g., >5× threshold) is not necessarily optimal or even desirable, for any of a variety of reasons given above. Therefore, after the OPO 400 is optimized to the desired degree with the optical modes 408 propagating through region 406a, the nonlinear optical medium can be translated (using positioning mechanism 420) to another region that has a higher QPM order than region 406a (e.g., region 406b arranged for $3^{rd}$ order QPM). The optical parametric gain provided by nonlinear optical medium 406 is thereby reduced and the OPO 400 can operate closer to threshold. The alignment and optimization established with the OPO 400 operating farther above threshold is substantially undisturbed by translation of the medium 406. Further optimization of the OPO 400 can be performed with the reduced parametric gain provided by region 406b without the need for initially establishing oscillation (which becomes significantly more difficult with decreasing parametric gain). This stepwise alignment and optimization process can be repeated for additional regions 406c, 406d, and so on having successively higher QPM orders. Once optimized (in any of the ways described above) with modes 408 propagating through one of the regions 406x, the nonlinear medium 406 can be translated so that the modes 408 propagate through another of the regions 406x that has a higher QPM order, where further alignment and optimization can be performed.

Figure 6:
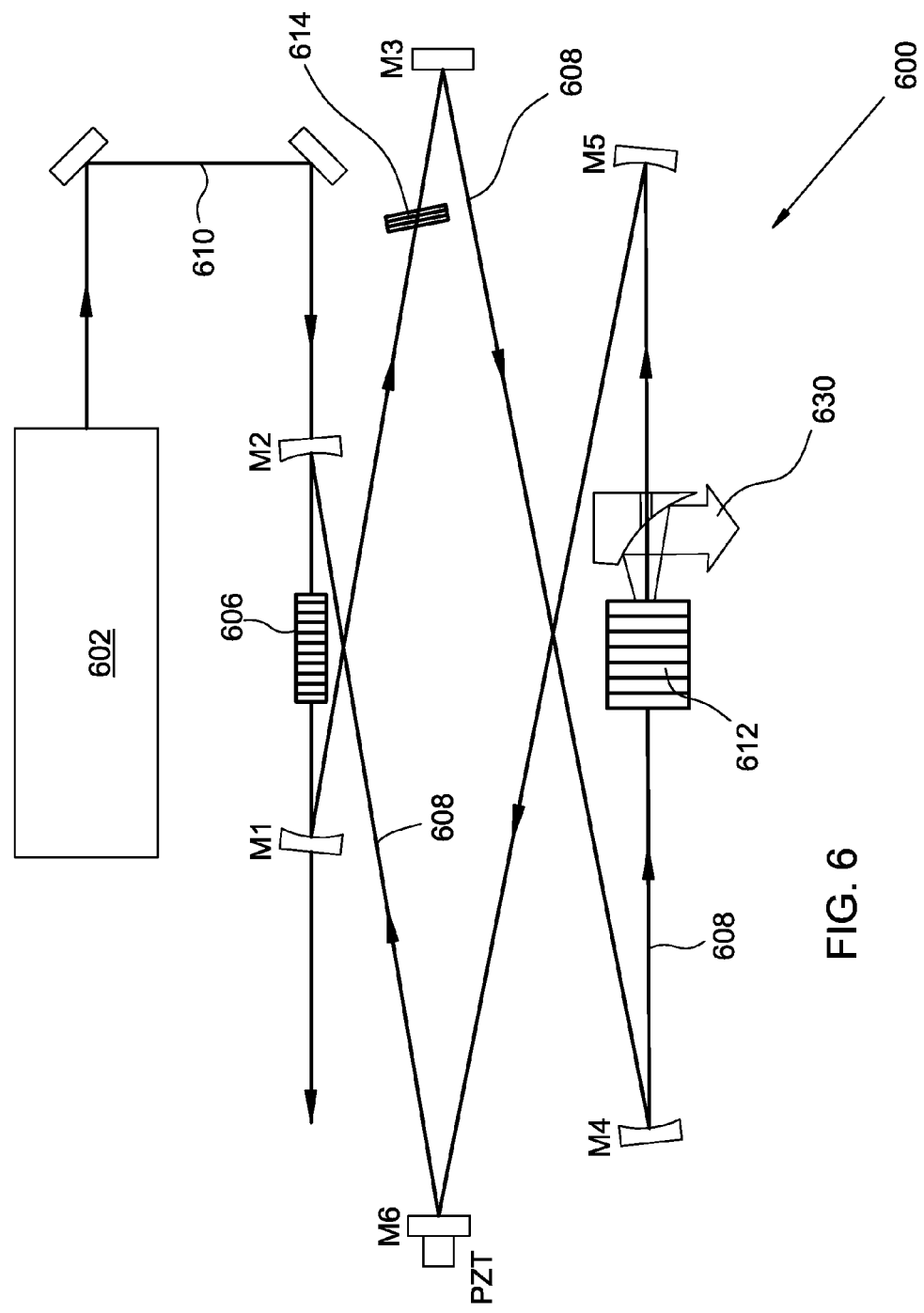
FIG. 6 illustrates schematically another exemplary embodiment of a synchronously pumped optical parametric oscillator.

A test system was constructed and characterized as shown in FIG. 6. The following are exemplary only and should not be regarded as limiting the scope of the present disclosure or appended claims. The pump laser source 602 comprised a Fianium FP1060-10-CST fiber laser operating at $\lambda_{pump}=1063.5$ nm with $P_{pump}=10$ W, $\tau_{pump}\approx 10$ ps, $R_{pump}=109.3$ MHz ($T_{pump}=9.149$ ns), and $\Delta v_{pump}\approx 0.5$ nm. The pump beam 610 was focused to a beam waist of about 50 µm in the nonlinear optical medium 606, which comprised a crystal of periodically poled lithium niobate (PPLN). The crystal was 10 mm long, 7.4 mm wide, and 1 mm thick, and included four regions that extended longitudinally through the length of the crystal, were arranged across the width of the crystal, were each 1 mm wide, and were poled with periods of 31.78, 95.34, 158.90, and 222.46 µm, respectively ($1^{st}$ through $7^{th}$ odd QPM orders for optical parametric conversion of 1.06 µm pump to signal and idler between about 2.0 and 2.3 µm with all polarizations parallel, i.e., Type 0 phase matching). The entrance and exit faces were AR coated for 1064 nm and for 2040-2230 nm. The OPO 600 comprised six mirrors M1-M6: mirrors M1 and M2 were spherical with a radius of 200 mm; M4 and M5 were spherical with a radius of 500 mm; M3 and M6 (mounted on a piezoelectric ditherer for cavity length tuning or enhanced terahertz generation) were flat. All mirrors were highly reflective from 1900-2400 nm, and M1 and M2 transmitted over 99% at 1064 nm (to transmit pump beam 610). The OPO resonator 600 was arranged to support modes 608 that exhibit a beam waist of about 70 µm in the nonlinear medium 606 between M1 and M2 and a second beam waist of about 250 µm between M4 and M5.

A QPM stack 612 of eleven optically contacted GaAs plates arranged to generate radiation at about 1.5 THz by difference frequency generation (also referred to as frequency down-conversion) of the signal and idler radiation were positioned at the beam waist between M4 and M5. The doubly resonant OPO cavity included a thin etalon 614 that results in spectral peaks spaced by the desired 1.5 terahertz output frequency, as described by Vodopyanov et al (CLEO 2009, cited above). The OPO is operated near its degeneracy point (i.e., $\lambda_{sig}\approx\lambda_{idler}$), which, in conjunction with Type 0 phase matching, results in oscillation of multiple spectral lines and blurring of the distinction between signal and idler. The spacing by the etalon of the spectral peaks of the oscillating signal and idler radiation by the desired terahertz frequency enhances the overall efficiency of the terahertz generation. Overall round trip loss is about 2.2% for the signal and idler.

With the optical modes 608 propagating through the $1^{st}$ order QPM region (31.78 µm poling period), oscillation thresholds between about 10 mW and about 25 mW of pump power were observed, depending on the beam quality of the pump source and singly versus doubly resonant OPO operation. At 9.5 W of pump power, about 3.28 W of pump power was consumed (35% pump depletion) to produce about 149 W of circulating intracavity power (signal plus idler, estimated by measuring power leakage through one of the cavity mirrors).

After optimizing the resonator alignment near threshold, the nonlinear optical medium 606 was then translated so that the optical modes 608 propagated through the $3^{rd}$ order QPM region (95.34 µm poling period). About 250 W of circulating optical power was observed when pumped at 9.5 W, with about 5.5 W of pump power consumed (58% pump depletion). Threshold pump power was 2.3 W.

After again optimizing the resonator alignment near threshold (with the modes 608 propagating through the $3^{rd}$ order QPM region), the nonlinear optical medium 606 was then translated so that the optical modes 608 propagated through the $5^{th}$ order QPM region (158.90 µm poling period). About 220 W of circulating optical power was observed when pumped at 9.5 W, with about 4.9 W of pump power consumed (51% pump depletion). Threshold pump power was 3.7 W.

After again optimizing the resonator alignment near threshold (with the modes 608 propagating through the $5^{th}$ order QPM region), the nonlinear optical medium 606 was then translated so that the optical modes 608 propagated through the $7^{th}$ order QPM region (222.46 µm poling period). About 149 W of circulating optical power was observed when pumped at 9.5 W, with about 3.28 W of pump power consumed (35% pump depletion). Threshold pump power was 4.15 W.

It was noted that the OPO resonator 600 became progressively more sensitive to alignment changes with increasing QPM order. At $5^{th}$ and $7^{th}$ orders, in particular, it became difficult to optimize the OPO due to mechanical limitations of the optical mounts employed and sensitivity limitations of manual adjustment of those mounts. It is possible that higher intracavity power and lower threshold could be achieved with more precise and sensitive optical mounts.

In the examples disclosed, the odd QPM orders of the regions of the nonlinear optical medium 406 or 606 include consecutive odd orders beginning with the first order (e.g., $1^{st}$, $3^{rd}$, $5^{th}$, and $7^{th}$ orders for nonlinear optical medium 606), and those regions are arranged across the width of the medium in order of their respective QPM orders. This need not be the case, however, and any suitable set of odd orders, arranged in any spatial order or arrangement, can be employed within the scope of the present disclosure or appended claims.

Figure 7:
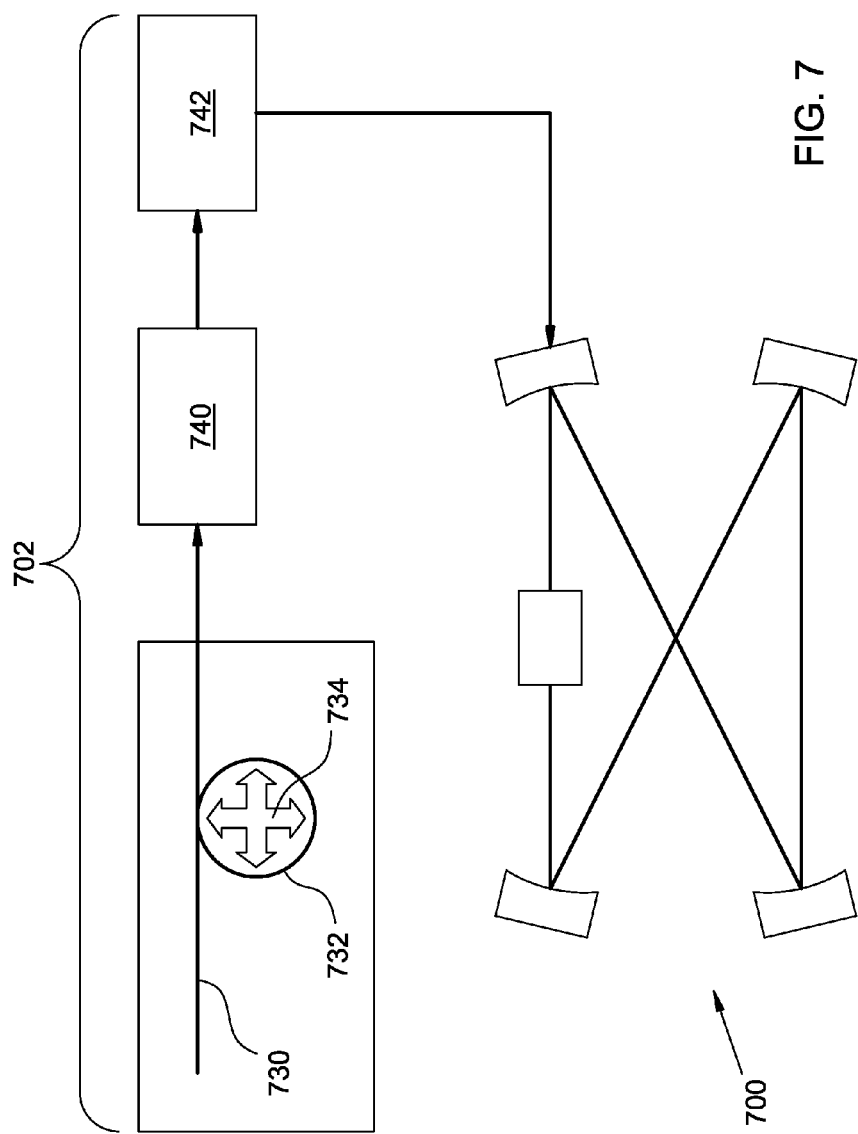
FIG. 7 illustrates schematically another exemplary embodiment of a synchronously pumped optical parametric oscillator.

Another arrangement for optimizing operation of a synchronously pumped OPO is illustrated schematically in FIG. 7. As noted above, substantially matching the repetition rates of the pump laser source and the OPO resonator (or integer multiples, integer submultiples, or rational multiples thereof) is desirable for optimizing the parametric gain available in the OPO. A need for adjusting the pump laser source or the OPO resonator to match their repetition rates can arise, e.g., from length instabilities in either or both of the pump source or OPO (mechanical or, more likely, thermal), or from substituting a non-linear optical medium or other transmissive element of the OPO resonator for one of a differing optical pathlength (due to differing physical length or differing refractive index). Such cavity length matching is conventionally achieved by mounting at least one mirror of the OPO on a linear translator. Movement of the mirror alters the physical length of the OPO cavity and thereby also alters its repetition rate. Such cavity length adjustment can be decoupled from overall resonator cavity alignment by translating a normal-incidence end mirror of a linear resonator cavity. However, the mirrors of a ring resonator cavity are arranged at non-normal incidence, thereby coupling translation of its mirrors to overall cavity alignment. That issue can be mitigated by instead adjusting the repetition rate of the pump laser source to match a substantially fixed cavity length of the OPO resonator cavity. Such adjustment of the pump laser repetition rate is straightforward if the pump laser source includes a linear oscillator that has a translating end mirror (as described above for a linear OPO resonator).

However, various embodiments disclosed herein comprise a pump laser source that includes a fiber laser oscillator. A fiber laser oscillator does not employ cavity end mirrors, but instead includes grating reflectors imparted into the fiber itself. The length of the fiber between the grating reflector determines the pump repetition rate; translation of a cavity mirror cannot be employed for adjusting the pump repetition rate. In the exemplary embodiment illustrated schematically in FIG. 7, the pump laser source 702 comprises a fiber laser oscillator 730, and can optionally include one or more additional laser amplification stages 740 and 742 (preferably based on fiber laser media, but optionally based on other laser gain media of any suitable type, e.g., solid state, semiconductor, etc.). Such a combination of oscillator and amplifier is often referred to as a MOPA (an acronym for Master Oscillator Power Amplifier). In the example of FIG. 7, the fiber laser oscillator includes an intermediate segment 732 between its fiber grating reflectors that is arranged to be stretched to a controlled, variable degree by a mechanical actuator 734. Stretching the intermediate segment 732 alters the overall length of the fiber laser oscillator 730, thereby altering its repetition rate commensurately. The actuator 734 can comprise any suitable manual, mechanized, or automated actuator, and can be arranged with the intermediate segment 732 in any suitable way to enable controlled, variable stretching of the segment 732. In one exemplary embodiment, the actuator 734 comprises a piezoelectric mandrel and the intermediate segment 732 forms one or more loops around the mandrel. Applying a variable control voltage to the mandrel causes it to expand transversely to a variable extent, thereby stretching the looped intermediate segment 732 to a variable extent. However the actuator 734 and intermediate segment 732 are arranged, the stretching of the intermediate segment 732 to match the pump repetition rate to the OPO repetition rate can be performed manually when needed or desired, or the actuator can be controlled via a feedback controller in response to an electrical error signal generated by pump/OPO repetition rate mismatch. Upon initial arrangement and alignment of the OPO 700, the OPO cavity can first be arranged so that its repetition rate roughly matches the pump laser source oscillator repetition rate, and then the actuator 734 can be employed to more precisely match the repetition rates (manually or using automated feedback control). If the OPO resonator repetition rate is later altered (e.g., by substituting a nonlinear medium of a differing length), the actuator can be employed to match the pump repetition rate to the altered OPO repetition rate (manually or using automated feedback control as is known in the art).

Figure 8:
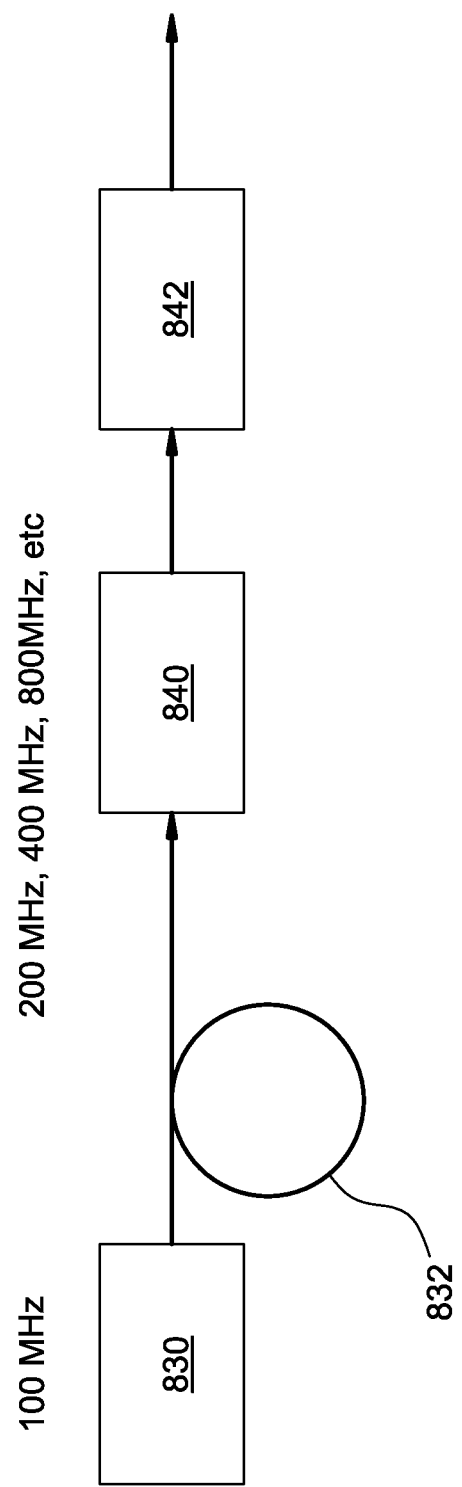
FIG. 8 illustrates schematically another exemplary embodiment of a synchronously pumped optical parametric oscillator.
Figure 9B:
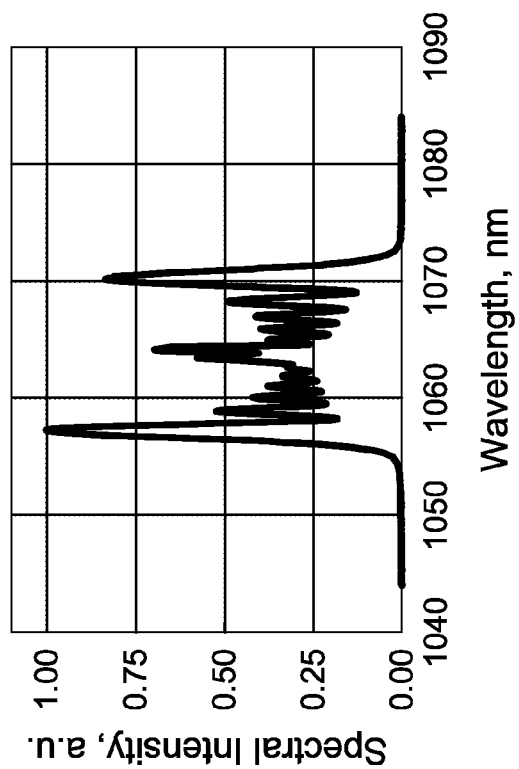
FIGS. 9A and 9B illustrate spectral broadening of an amplified fiber laser.
Figure 9A:
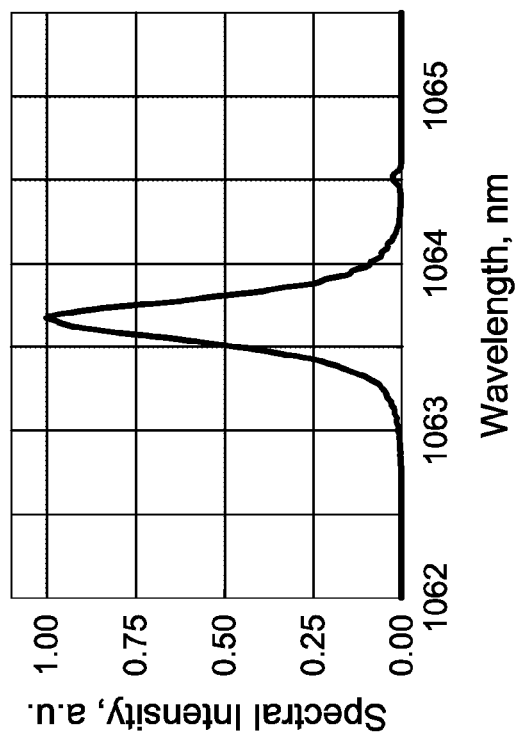

Another arrangement for optimizing operation of a synchronously pumped OPO is illustrated schematically in FIG. 8. To obtain increased output power from the synchronously pumped OPO, one can increase the pump power. However, it has already been noted that operating the OPO too far above threshold (e.g., >5× threshold) can lead to undesirable operating characteristics of the OPO due to increased nonlinear optical effects. In addition, properties of the pump laser source can be altered in potentially undesirable ways when the pump pulse train is amplified to higher average and peak power. As shown in the examples of FIGS. 9A and 9B, amplification of the pump laser master oscillator output from 10 mW average power to 20 W average power results in significant spectral and temporal broadening due to self-phase modulation (a nonlinear optical effect) and group velocity dispersion in a pump laser fiber amplifier.

The average power of the pump laser source can be increased without also increasing peak power using the arrangement illustrated schematically in FIG. 8. A time-domain-multiplexer (TDM) fiber loop 832 is inserted between the pump laser master oscillator 830 and amplification stages 840 and 842 of the pump laser source 802. The TDM fiber loop 832 is arranged to divide a train of master oscillator optical pulses into multiple, temporally delayed replica trains of master oscillator optical pulses, and are known in the art. Depending on the number of replica pulse trains, the pump laser source repetition rate can be increased by a factor of 2, 3, 4, or more. The average power from the amplification stages 840 and 842 can be increased by the same factor while keeping the peak pump laser power roughly constant, reducing potentially undesirable nonlinear optical effects in the fiber laser amplification stages.

Optical parametric gain is only present in the nonlinear optical medium during the time interval that the pump laser pulse is present in the medium; this is the basis of synchronous pumping as described above. In one exemplary arrangement, the round trip time of the OPO resonator cavity is substantially matched to the round trip time of the pump laser source oscillator 830, while the TDM loop 832 is employed to increase the repetition rate of the amplified pump laser source by a factor of N. Every Nth pulse of the amplified pump laser pulse train appears at the master oscillator repetition rate, but the intervening pump pulses appear at time intervals determined by the TDM loop 832 and do not necessarily appear at regularly spaced time intervals. Pumping the synchronously pumped OPO with such a composite pump pulse train results in a series of N substantially independent pulse trains resonating in the synchronously pumped OPO resonator at the signal or idler wavelength (or both if doubly resonant). The effect is to increase the pulse repetition rate and average power output of the OPO (at the signal, idler, or other output wavelength) by a factor of N without commensurately increasing the peak power in the OPO cavity, thereby enabling avoidance of unwanted or undesirable nonlinear optical effects in the OPO (e.g., operating more than 5× above threshold).

In another exemplary arrangement employing a TDM loop 832 in the pump laser source, the TDM loop 832 can be arranged to produce pump pulse trains delayed by an integer submultiple of the pulse repetition time of the pump laser master oscillator 830, i.e., the TDM loop is used to create replica N pulse trains delayed by 1/N of the cavity round trip time of the pump laser master oscillator 830. The resulting pump repetition rate and average pump power after amplification are increased by a factor of N without commensurately increasing the peak pump power (as in the previous example), thereby avoiding potentially unwanted or undesirable nonlinear optical effects in the amplified pump laser output. However, the composite pulse train can be used to synchronously pump an OPO cavity having a cavity round trip time 1/N times that of the pump laser master oscillator 832 (i.e., a repetition rate N times that of the pump laser master oscillator 832). Both average and peak power increase in the OPO, perhaps by as much as a factor of N, or perhaps less if the increased intracavity OPO power results in saturation of the parametric gain due to pump depletion. Such an arrangement enables a more compact arrangement of the OPO optical resonator due to its reduced length (reduced by a factor of N). Operation of a synchronously pumped OPO according to this arrangement requires substantial matching of both the delay time of the TDM loop 832 and the round trip time of the OPO resonator to a submultiple of the repetition time of the pump laser master oscillator 832.

Figure 2:
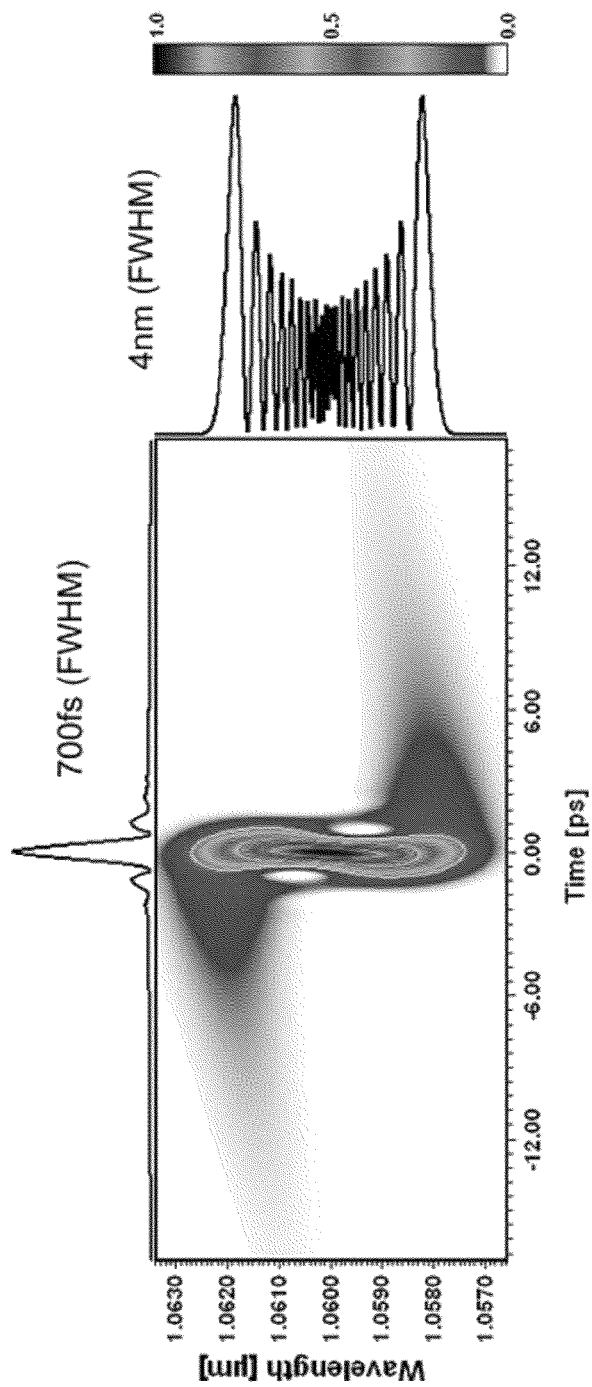
FIG. 2 illustrates temporal and spectral profiles produced by a dispersion compensator.

Another arrangement for optimizing operation of a synchronously pumped OPO is illustrated schematically in FIG. 10. It has already been noted that amplification of a pump laser master oscillator can alter the spectral and temporal properties of the pump laser source through self-phase modulation (SPM) and group velocity dispersion (GVD) in a pump laser fiber amplifier (as in FIGS. 9A and 9B). In FIG. 10, a dispersion compensator 1032 is inserted between the amplified pump laser source 1002 (comprising oscillator 1030 and amplification stages 1040 and 1042) and the synchronously pumped OPO 1000. Dispersion compensators are conventional and can assume several different forms, e.g., pairs of prisms, pairs of diffraction gratings, and so on, and are typically used to achieve a minimum pulse duration for a given optical spectrum that has been temporally broadened by GVD. Examples of temporal and spectral profiles produced by a dispersion compensator are shown in FIG. 2.

Figure 11:
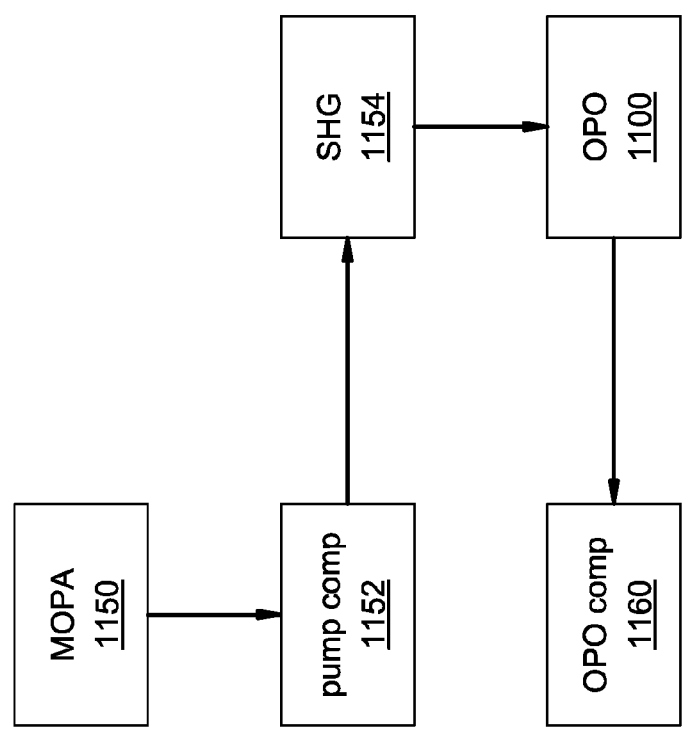
FIG. 11 illustrates schematically another exemplary embodiment of a synchronously pumped optical parametric oscillator.

Another exemplary embodiment of a synchronously pumped OPO is illustrated schematically in the block diagram of FIG. 11. A MOPA 1150 (including, e.g., a fiber laser master oscillator and one or more fiber amplifier stages) produces about 10 W of average power at 1064 nm as a train of 10 ps pulses at about a 100 MHz repetition rate. That output enters pump pulse compressor 1152 (typically a fiber-grating compressor), the output of which is frequency doubled to 532 nm in the second harmonic generator 1154. Any suitable nonlinear optical medium, in any suitable phase-matching arrangement, can be employed in the second harmonic generator 1154. One suitable medium is lithium triborate (LBO; $LiB_3O_5$), which can be critically or non-critically phase-matched (i.e., angle-tuned or temperature-tuned) to convert 1064 nm to 532 nm. Depending on the MOPA and compressor output (power and pulse duration), 3-5 W of average power at 532 nm can be produced by the second harmonic generator 1154, with pulse durations ranging from about 0.2 ps to about 10 ps. The output of the MOPA/compressor/SHG 1150/1152/1154 can be used to synchronously pump an OPO 1100 with $\lambda_{pump}$=532 nm. The output of the OPO 1100 (signal, idler, harmonics, or difference frequency) can be compressed using another pulse compressor 1160 (e.g., to compensate for group velocity dispersion in the OPO resonator or nonlinear medium therein). Compressor 1160 can also be referred to as a dispersion compensator.

Figure 12:
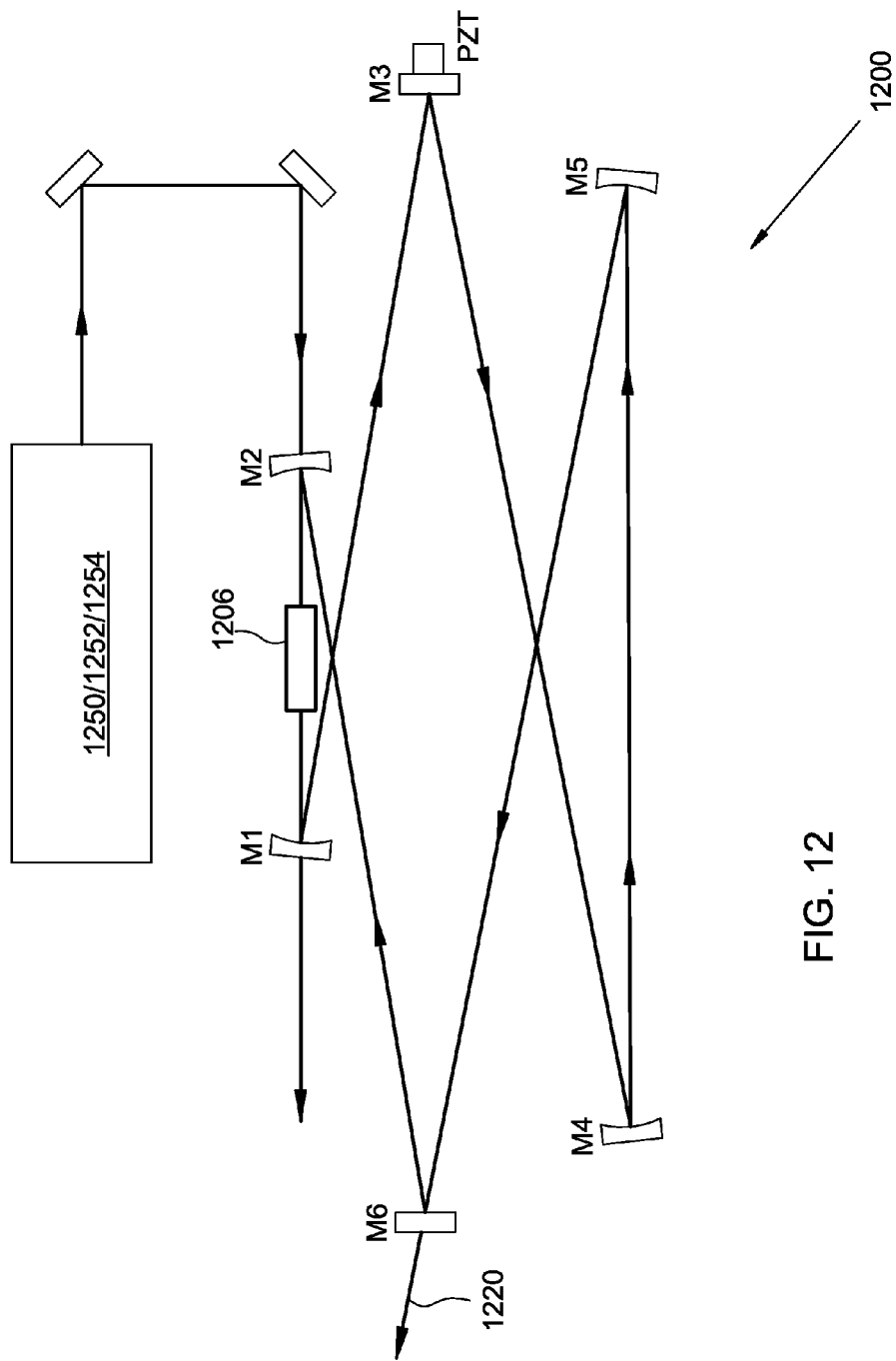
FIG. 12 illustrates schematically another exemplary embodiment of a synchronously pumped optical parametric oscillator.
Figure 14:
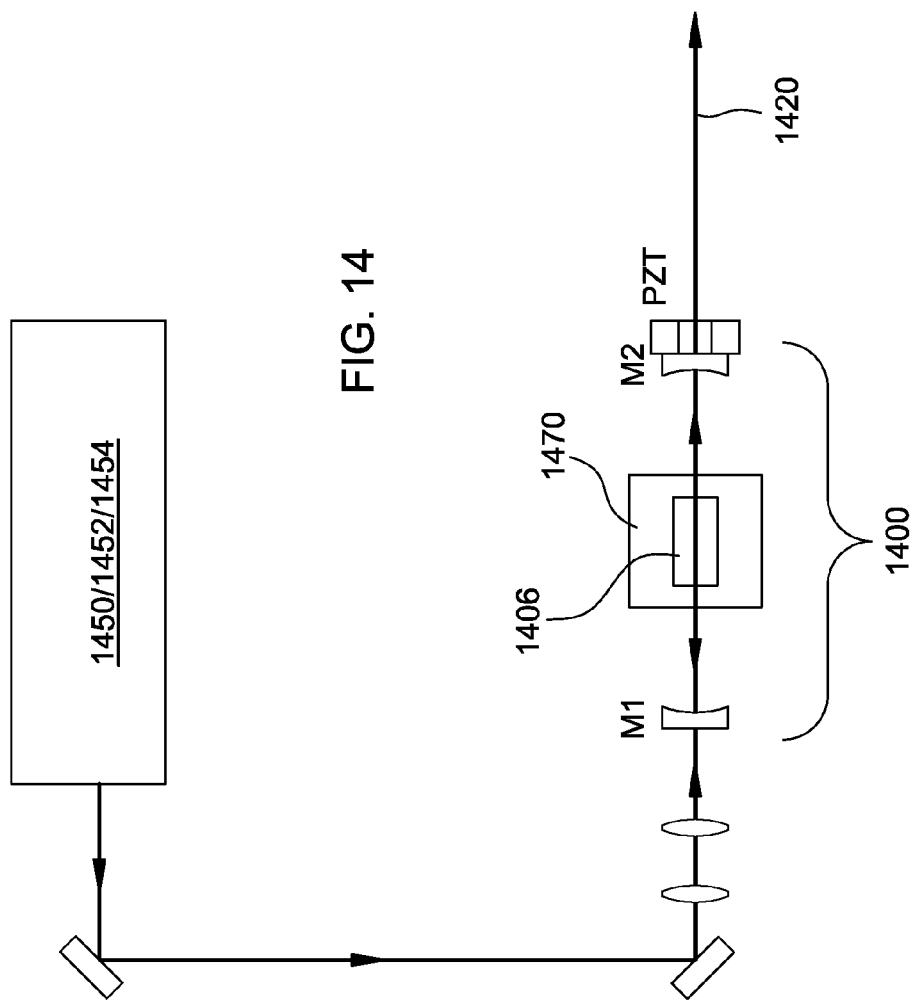
FIG. 14 illustrates schematically another exemplary embodiment of a synchronously pumped optical parametric oscillator.

Several exemplary OPOs are illustrated schematically in FIGS. 12-14, each pumped at 532 nm by a MOPA/compressor/SHG combination similar to that depicted in FIG. 11. LBO can be employed as the nonlinear medium that provides the parametric gain when pumped by the compressed, frequency-doubled MOPA output. In the example of FIG. 12, MOPA/compressor/SHG 1250/1252/1254 synchronously pumps OPO 1200 at 532 nm. The nonlinear medium 1206 can typically comprise non-critically phase-matched, single-crystal LBO, and the ring resonator can be arranged similarly to that shown in FIG. 6. In the example of FIG. 12, mirror M6 is arranged to transmit the signal or idler wavelength, which emerges as output beam 1220. When pumped at 532 nm at about 5 W, OPO output can be obtained across a tuning range of about 800-1064 nm (signal) or about 1064-1600 nm (idler), at about 1 W of average power at the peak of the tuning curve. If desired, a second nonlinear optical medium can be employed within the resonator 1200 (not shown; analogous to FIG. 6) to generate harmonics of the signal or idler or the difference frequency between them. Whichever output is used, an additional dispersion compensator (i.e., pulse compressor; not shown) can be employed.

In the example of FIG. 13, a simple, two-mirror, linear resonator cavity 1300 is employed. Angle-tuned, critically phase-matched LBO is the nonlinear optical medium 1306, which is mounted on a rotation stage 1370. The nonlinear medium 1306 is synchronously pumped at 532 nm by the output of MOPA/compressor/SHG 1350/1352/1354, which is directed through mirror M1 and through nonlinear medium 1306 by a series of steering mirrors and lenses. The lenses can be chosen to yield a desired beam waist size and confocal parameter for the 532 nm pump beam within the nonlinear medium 1306 (e.g., chosen to achieve a sufficient degree of spatial mode matching between the pump beam and the signal or idler beams). A pump steering mirror and the pump lenses are shown positioned on a translator 1372. Synchronized motion of translator 1372 and rotation stage 1370 keep the pump beam properly overlapped with the signal and idler beams within the OPO resonator 1300 as the nonlinear medium 1306 rotates, and reduces or eliminates movement of the output beam 1320. The output of OPO 1300 emerges through mirror M2 as optical beam 1320. An additional dispersion compensator (not shown) can be employed. The example of FIG. 14 is similar to that of FIG. 13, except that a temperature-tuned, non-critically phase-matched LBO crystal is employed as the nonlinear optical medium 1406 in OPO resonator 1400. The LBO crystal is housed within an oven 1470 for temperature tuning.

In any of the examples of FIGS. 12-14, the MOPA can be arranged as shown in FIG. 7 for matching the pump repetition rate to the OPO resonator repetition rate, to achieve synchronous pumping. The examples of FIGS. 13 and 14 are particularly amenable to high repetition rate operation, because a simple, two-mirror OPO resonator cavity 1300/1400 is readily shorted to provide the higher repetition rate. Accordingly, the MOPA 1350 or 1450 can be adapted in a manner similar to that shown in FIG. 8 for providing a high repetition rate pump source (e.g., about 200 MHz, 400 MHz, or 800 MHz, instead of about 100 MHz).

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable combination of disclosed or claimed features (i.e., combinations of features that are not incompatible or mutually exclusive) that appear in the present disclosure or the appended claims, including those combinations of features that may not be explicitly disclosed herein. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open ended terminology, with the same meaning as if the phrase "at least" were appended after each instance thereof.

In the appended claims, if the provisions of 35 USC §112 ¶ 6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶ 6 are not intended to be invoked for that claim.

What is claimed is:

1. A method comprising:
arranging an optical resonator comprising two or more mirrors to support one or more resonant optical modes at a signal wavelength or an idler wavelength;
positioning a nonlinear optical medium within the resonator, which nonlinear optical medium is arranged to provide optical parametric gain at the signal and idler wavelengths when optically pumped at a pump wavelength; and
optically pumping the nonlinear optical medium at the pump wavelength using a pump laser source that includes a modelocked fiber laser master oscillator, one or more fiber laser amplification stages, and a TDM fiber loop between the master oscillator and the amplification stages, which TDM fiber loop is arranged to divide a train of master oscillator optical pulses into multiple, temporally delayed trains of master oscillator optical pulses.

2. The method of claim 1 wherein:
a pulse repetition rate of the optical resonator matches that of the master oscillator; and
each temporally delayed train of master oscillator pulses, after amplification in the fiber laser amplification stages, produces a corresponding train of optical pulses from the optical resonator.

3. The method of claim 1 wherein:
the TDM fiber loop has a length selected so that the multiple, temporally delayed trains of master oscillator pulses together comprise a composite train of master oscillator pulses having a repetition rate that is a multiple of that of the master oscillator; and
a pulse repetition rate of the optical resonator is a multiple of that of the master oscillator.

4. The method of claim 1 wherein the optical resonator comprises a ring optical resonator.

5. An apparatus comprising:
an optical resonator comprising two or more mirrors arranged to support one or more resonant optical modes at a signal wavelength or an idler wavelength;
a nonlinear optical medium positioned within the resonator, which nonlinear optical medium is arranged to provide optical parametric gain at the signal and idler wavelengths when optically pumped at a pump wavelength; and
a pump laser source arranged to optically pump the nonlinear optical medium at the pump wavelength, which pump laser source includes a modelocked fiber laser master oscillator, one or more fiber laser amplification stages, and a TDM fiber loop between the master oscillator and the amplification stages, which TDM fiber loop is arranged to divide a train of master oscillator optical pulses into multiple, temporally delayed trains of master oscillator optical pulses.

6. The apparatus of claim 5 wherein:
a pulse repetition rate of the optical resonator matches that of the master oscillator; and
each temporally delayed train of master oscillator pulses, after amplification in the fiber laser amplification stages, produces a corresponding train of optical pulses from the optical resonator.

7. The apparatus of claim 5 wherein:
the TDM fiber loop has a length selected so that the multiple, temporally delayed trains of master oscillator pulses together comprise a composite train of master oscillator pulses having a repetition rate that is a multiple of that of the master oscillator; and
a pulse repetition rate of the optical resonator is a multiple of that of the master oscillator.

8. The apparatus of claim 5 wherein the optical resonator comprises a ring optical resonator.

* * * * *